May 30, 1967 J. R. DAVIS ET AL 3,323,132

PORTABLE MAGNETIC DIGITAL RECORDER FOR USE IN UTILITY METER READING

Filed Aug. 17, 1961 5 Sheets-Sheet 1

INVENTORS
JOHN R. DAVIS
EDWIN D. NUTTALL
ALBERT M. RANDOLPH

BY Adolph C Hugin

ATTORNEY

INVENTORS
JOHN R. DAVIS
EDWIN D. NUTTALL
ALBERT M. RANDOLPH

BY Adolph C. Hugin
ATTORNEY

INVENTORS
JOHN R. DAVIS
EDWIN D. NUTTALL
ALBERT M. RANDOLPH
BY Adolph C Hugin
ATTORNEY INVENTORS
JOHN R. DAVIS
EDWIN D. NUTTALL
ALBERT M. RANDOLPH
BY Adolph C. Hugin
ATTORNEY May 30, 1967 J. R. DAVIS ET AL 3,323,132
PORTABLE MAGNETIC DIGITAL RECORDER FOR USE IN UTILITY METER READING
Filed Aug. 17, 1961 5 Sheets-Sheet 5
FIG. 13 A-C RECORDER
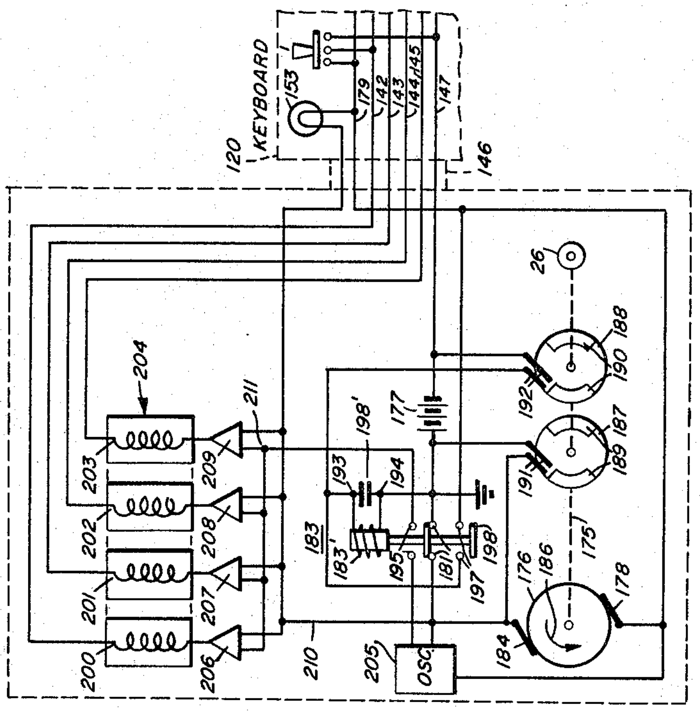
FIG. 12 D-C RECORDER
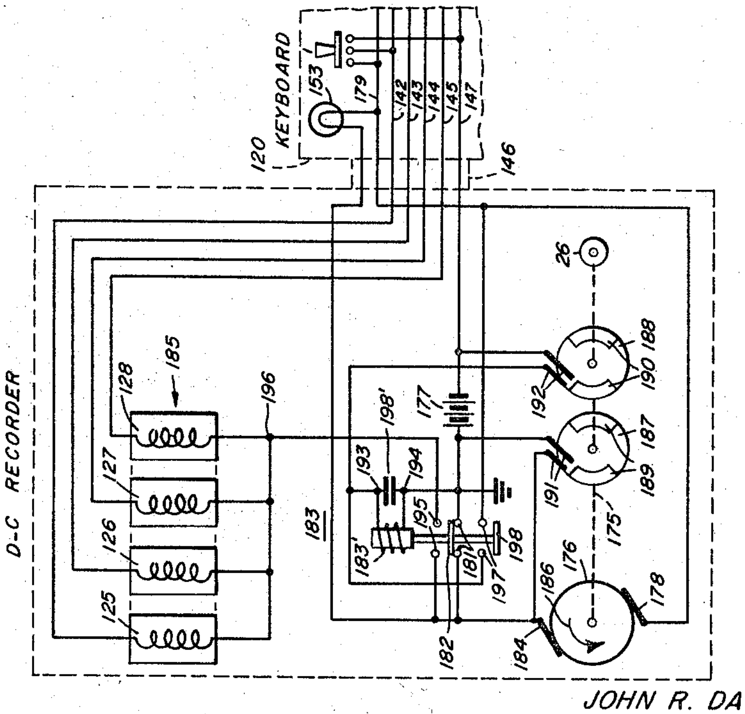
INVENTORS
JOHN R. DAVIS
EDWIN D. NUTTALL
ALBERT M. RANDOLPH
BY Adolph C. Hugin
ATTORNEY United States Patent Office
3,323,132
Patented May 30, 1967

3,323,132

PORTABLE MAGNETIC DIGITAL RECORDER FOR USE IN UTILITY METER READING

John R. Davis, Edwin D. Nuttall, and Albert M. Randolph, Shreveport, La., assignors to United Gas Corporation, a corporation of Delaware
Filed Aug. 17, 1961, Ser. No. 132,157
23 Claims. (Cl. 346—74)

This invention relates to recording devices and more particularly to magnetic digital recorders.

Recording devices of various types are used for many purposes in modern business and industry, and the increasing complexity of such operations, particularly in the volume of units, readings, etc., which may be handled, has resulted in recorders which are generally rather bulky and in the form of desk or floor type equipment. For many purposes, this restricts the use of the recorders.

The present invention provides a portable magnetic digital recorder of relatively small size, which is simple to operate and capable of recording digits and instructions in any of several codes at relatively low speeds. It is a device of the type which is especially useful in the acquisition of data for a computing system, and its flexibility is greatly enhanced in that word lengths are not inherently limited but can comprise any desired number of information symbols which can be received by computers with which the magnetic tape is to be utilized. It can be used for any purpose in which listings of numbers, the preparation of tallies, readings, or the like are required. For example, the device may be used in stores for taking inventories, in railroad yards for checking car numbers, in reading utility meters for noting the meter numbers and amount of the utility consumed.

Information recorded on a magnetizable memory member, such as magnetic tape, by a device incorporating the present invention forms a storage or memory of the information which may be utilized at a subsequent time in a computing system to which it is supplied through a proper interpreter or conversion unit which utilizes the information coded in the magnetic memory member and interprets it with internally generated or precoded instructions which are then supplied as input data to the computing system for data processing.

An object of this invention is to provide a simple portable apparatus for recording data in digital form on a magnetizable memory member.

Another object of this invention is to provide an apparatus for recording on a magnetizable memory member, such as magnetic tape, discrete symbols representative of digits or letters, together with a symbol which defines the end of a word for computer instructions.

A further object of this invention is to provide an apparatus for magnetically recording symbols wherein an end-of-word symbol is available to the operator at any time, so that the length of a word may be defined as determined by the operator.

Still another object of this invention is to provide a magnetic digital recorder having a symbol which when recorded on tape will provide instructions to a computer that the preceding entry is in error and to substitute the following entry for the one which has been indicated as being erroneous.

A still further object of this invention is to provide a means for recording discrete symbols on magnetic tape at a relatively low speed and in which the tape speed is not a function of the recording process.

Another object of this invention is to provide a device for magnetically recording data which is divided into word lengths and in which the magnetizable memory member is moved across a recording head during the recording or in which it is moved between recordings and the recording is performed intermittently while the memory member is stationary.

Another object of the invention is to provide an apparatus which can record each digit of a number or word instantaneously when a button is pressed or a similar record function is otherwise initiated.

A yet further object of this invention is to provide a device for magnetically recording data in which magnetic tape is kept in accurate contact and alignment with a multi-channel recording head or heads at all times so as to prevent erratic recordings and minimize the possibility of errors in interpretation of the recordations due to substantial misalignments of the recordings in different channels on the tape.

Still another object of this invention is to provide visible indications to an operator that a recording cycle is under way and also that such a recording cycle has been completed.

A further object of this invention is to provide an improved magnetic digital recorder having means for advancing the magnetic tape across a recording head for each recording cycle, which assures the advance of a substantially predetermined step or length of tape for each recording cycle and limits the operation of the tape advancing means to a predetermined cycle regardless of the position of the switches or other means which initiate a cycle of operation.

Yet another object of this invention is to provide an improved magnetic digital recorder with means for assuring a predetermined cycle of operation upon the closure of any switch or other cycle initiating means and which prevents the closure of any other similar switch or initiating means until all such switches or means are open and in position to start a new recordation by the closure of such a switch or means.

Another object of this invention is to provide a device for magnetically recording data in which computer instructions may be recorded on tape along with the data.

A further object of this invention is to provide a magnetic digital recorder having means for moving a magnetizable member a substantially predetermined step or extent across a multi-channel recording head for each complete recording cycle, and provided with switch means adapted to energize one or more selected channels of the recording head in accordance with the symbol represented by the respective switch means for a substantially predetermined fraction of the step of advance of the magnetizable member for each complete operating cycle, and operable by either alternating or direct current.

Further objects and advantages of this invention will become apparent from the following description referring to the accompanying drawings, and the features of novelty which characterize this invention will be pointed out with particularity in the claims appended to and forming a part of this specification.

In the drawings:

FIG. 1 is a schematic diagram illustrating an embodiment of the present invention comprising an alternating-current recorder and having a keyboard which can form part of the recorder unit or be a separate unit which may conveniently be attached to the recorder by a suitable plug-in arrangement;

FIG. 2 is a fragmentary view, partly in section, of a modification of the keyboard shown in FIG. 1, illustrating an embodiment for latching the symbol switches to assure a predetermined cycle of operation on the closure of any of the switches and preventing closure of other switches until the recordation has been completed and all of the switches are open and in position to start a new recordation, showing the switches all open and in unlatched positions;

Figures 10, 11:
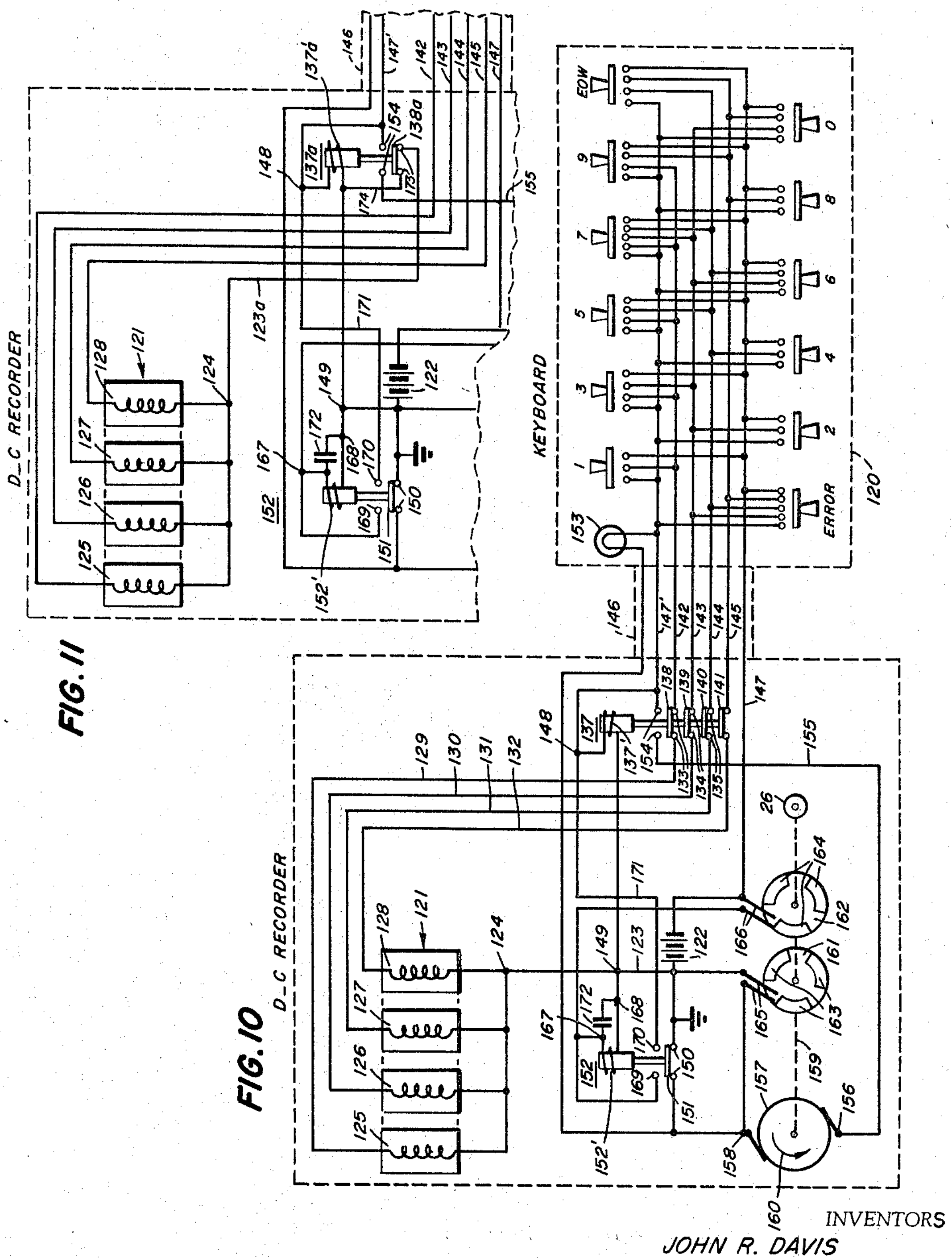

FIG. 10 is a schematic diagram illustrating another embodiment of the present invention wherein the magnetic recorder is shown as a direct current instrument in which the recordations are performed while the magnetizable member is stationary and in which it is advanced past the recording head after each recordation in order to provide a gap between longitudinally adjacent bits and thus complete each recording cycle;

FIG. 11 is a fragmentary view of a simplified version of the FIG. 10 magnetic digital recorder;

FIG. 12 is a schematic diagram illustrating another embodiment of a direct-current recorder and fragmentarily illustrating a suitable keyboard which may be of the type shown in FIG. 10; and FIG. 13 is a schematic diagram illustrating another embodiment of an alternating-current recorder and fragmentarily illustrating a suitable keyboard which may be of the type shown in FIG. 10.

Figures 1, 2, 3:
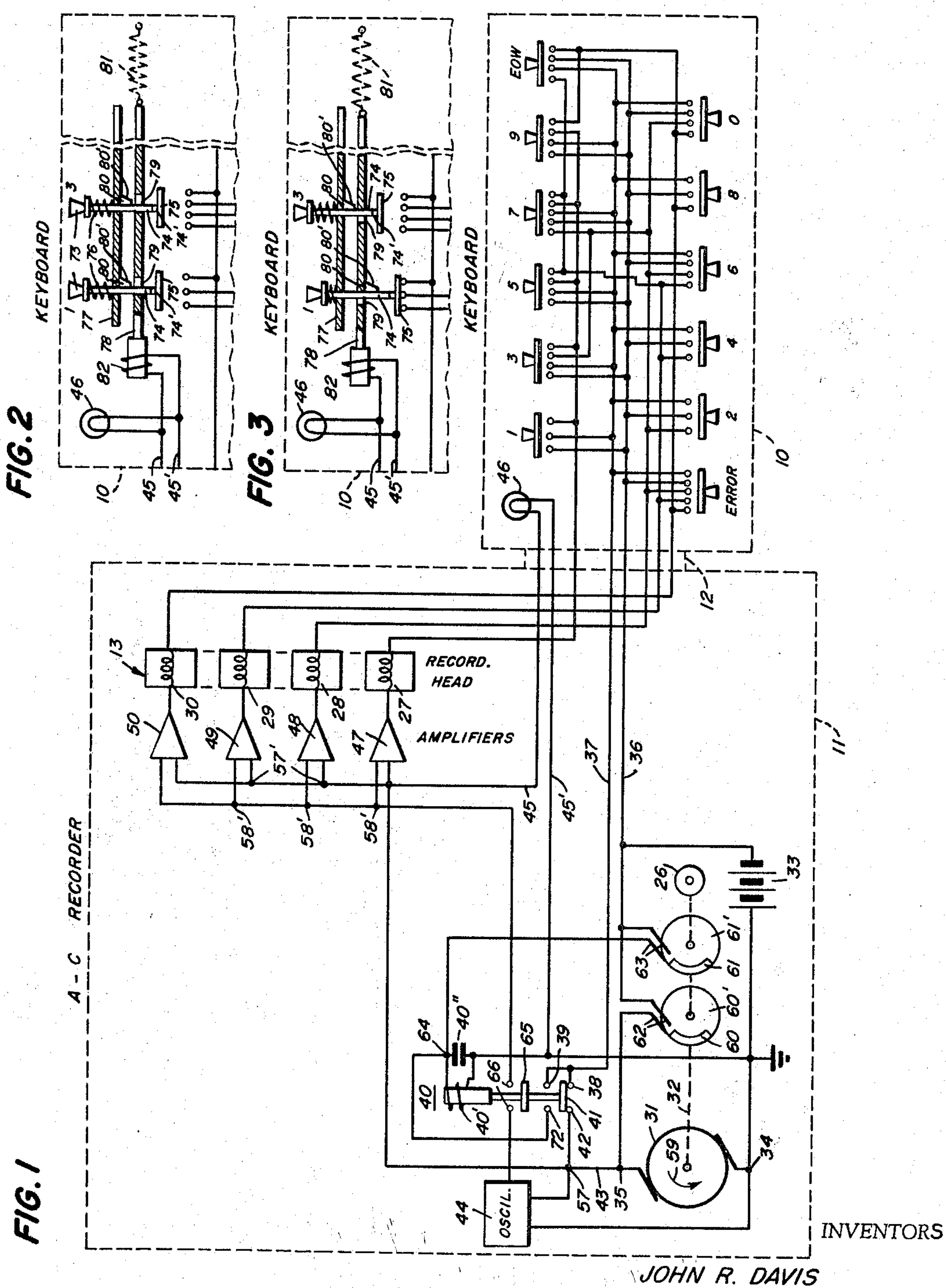
FIG. 3 is a fragmentary view of the same keyboard structure shown in FIG. 2, partly in section, illustrating the latched position of the operating switch keys when one of the keys is depressed to a closed switch position.

Referring to the drawings, FIG. 1 schematically illustrates an embodiment of the present improved portable magnetic digital recorder wherein alternating current is used to form the record on a suitable magnetizable memory member, such as magnetic tape. The present invention comprises any suitable circuitry for obtaining the desired recording in accordance with certain basic logics and may utilize alternating current or direct current in providing the operation of detailed features of the system. Generally, the decimal system is the more readily understood system of numeration; however, the binary system lends itself more readily to mechanical and electrical computations. It is desirable, therefore, to provide a numerical recorder which enables an operator to express digits in the decimal system and to have these decimal digits translated or coded and recorded in a binary or modified binary form. In addition, it may be found useful to provide a keyboard or dial for entering the digits which are to be recorded which is universally adaptable for both alternating-current and direct-current recorders. Such a keyboard may comprise any suitable switching matrix for entering the numerical values into the recorder and preferably is arranged so as to translate or convert the decimal figures into corresponding binary or modified binary code which can then be entered directly on the memory member used with the recorder.

In FIG. 1, a keyboard 10 is shown as a separate unit from an alternating-current recorder 11 and is adapted to be electrically connected thereto by any suitable coupling member, such as a conventional plug-in connecting cable 12. The keyboard 10 can readily be made integral with the recorder 11 and may comprise any suitable switches, such as buttons, wafer contactors, dial connectors or the like, conveniently marked to provide a visual indication of the digit or instruction represented by each. In the illustrated embodiment, the keyboard switches consist of twelve push button type switches which are normally spring biased in any suitable manner to open circuit positions. Ten of the push buttons preferably are numbered 1, 2, 3, 4, 5, 6, 7, 8, 9, and 0, so that an operator can enter any desired decimal digit in any desired order. Furthermore, this provides for the entry of as many consecutive digits as may be desired.

The keyboard also is provided with an end-of-word button EOW, which is adapted to complete an electrical circuit for entering a suitable symbol on the magnetizable memory member of the recorder to indicate the end of a word or the end of the number being entered. It should be remembered that in certain types of computers the length of a word or the number of digits in a number is limited for the specific equipment, and, therefore, an operator using a recorder must bear in mind that the word or number which is recorded must not exceed the number of symbols which can be utilized by the computer.

Furthermore, it is desirable that an operator should be able to enter into the record an instruction for the computer to disregard a certain entry because it is in error. This can readily be done simply by entering into the magnetizable memory member a symbol for this purpose. A suitable circuit in the computer or in a translator can be provided which is adapted to convert the information recorded on the magnetic memory member into instructions understandable by the computer which will cause the computer to disregard an erroneous entry and substitute therefor the immediately subsequent entry when a symbol which is indicative that the last preceding entry or word was in error is recorded on the memory member and is read so as to give a desired instruction impulse in such a circuit. An operator may conveniently enter an error symbol on the magnetizable memory member in the embodiment illustrated in FIG. 1 simply by closing a circuit through an ERROR button switch.

The various push button switches on the keyboard 10 are adapted to close electrical circuits for energizing the coils of four different channels of a multi-channel recording head 13. The recording head may be of any suitable type, and preferably is one which may be energized by either direct current or alternating current, so that it is more readily replaceable in case repairs or adjustments cannot easily be made to the one installed on the recorder. Preferably, the recording head is of the type in which the desired number of recording channels are substantially transversely aligned acoss the recording face of the head, so that the magnetizable memory member, such as magnetic tape, may be advanced longitudinally across the head, and any single channel or desired combination of channels may be utilized for simultaneously recording various symbols on the magnetizable memory member.

Figures 7, 8, 9:
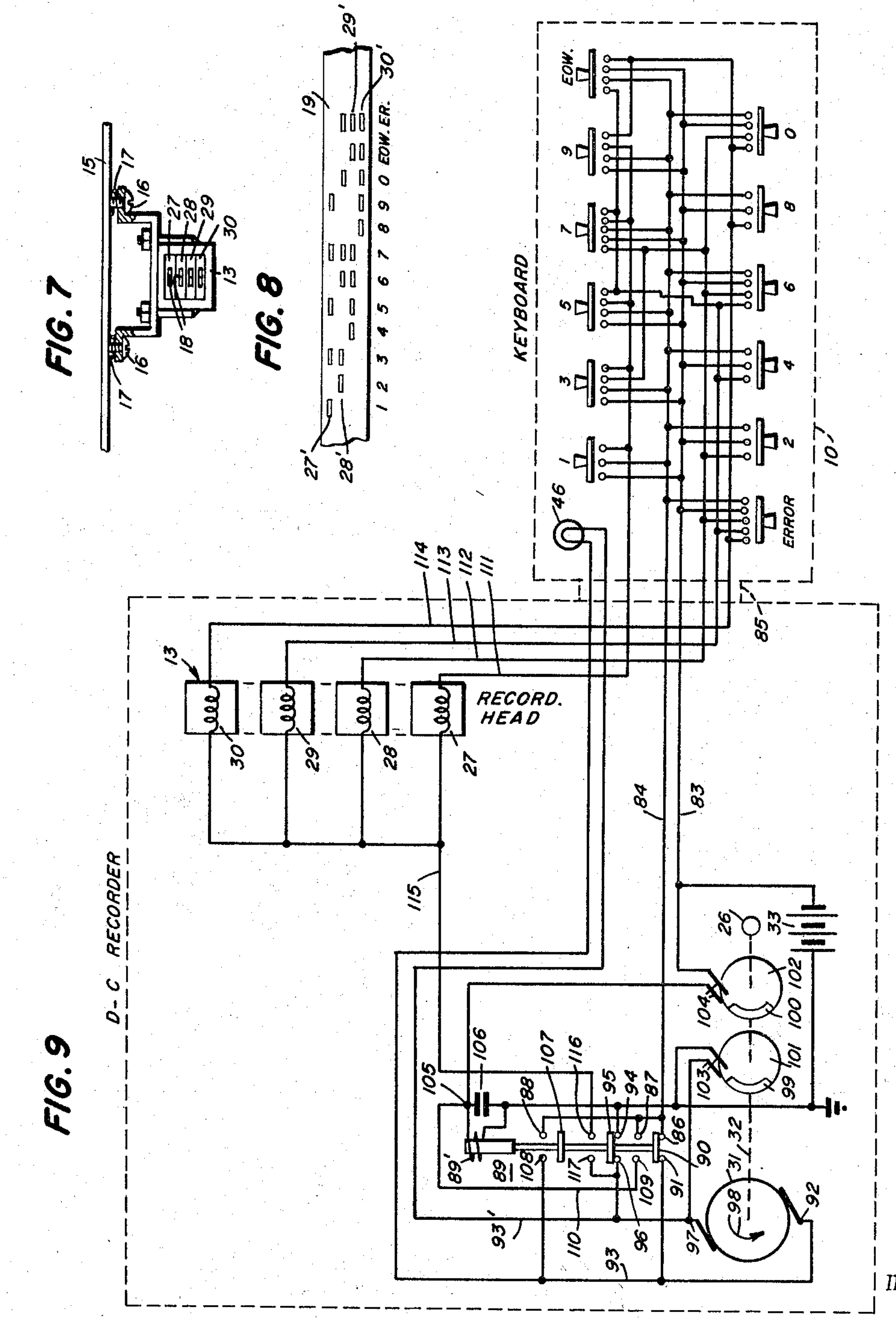
FIG. 7 is a fragmentary plan view shown with the magnetic tape removed and illustrating the adjustable mounting of a multi-channel recording head.
FIG. 8 is a plan view of a fragmentary section of tape schematically showing magnetic bits illustrative of recordations of various symbols as indicated thereon.
FIG. 9 is a schematic diagram illustrating a direct-current recorder provided with a keyboard similar to that in FIG. 1.

A four-channel recording head is schematically illustrated in FIG. 1 and is shown in plan view in FIG. 7. As shown in this latter figure, the recording head 13 is conveniently mounted on a bracket 14, which is adjustably secured to a frame or casing 15 of the recorder by any suitable adjustable fastening means, such as screws 16. Suitable compression springs 17 preferably are arranged between the recorder casing 15 and the adjacent surfaces of the bracket 14, so that adjustment of the screws 16 can provide for alignment of recording gaps 18 in the recording faces of the four channels in the recording head transversely of the magnetic tape or other memory member, both as to relative skew and transverse positions.

Figure 6:
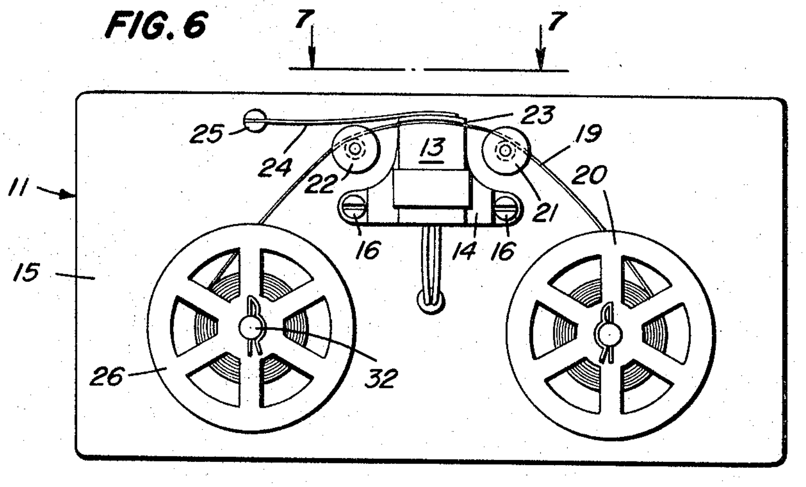
FIG. 6 is an elevational view illustrating the arrangement of a tape transport reel assembly and a multi-channel recording head of a type which may be used in a recorder such as that schematically illustrated in FIG. 1.

As is more clearly shown in FIG. 6, the magnetizable memory member may comprise a suitable magnetic recording tape 19, which is adapted to be advanced across the recording head 13 during each symbol recording cycle, so that a predetermined magnetic bit or combination of bits is recorded on the magnetic tape, and longitudinally discrete adjacent bits are spaced apart a substantially predetermined non-magnetized space on the tape. This tape 19 may conveniently be supplied from a pay-out reel 20 and pass over a guide 21 to the face of the recording head 13 and over a similar guide 22 on the other side of the recording head to assure the desired transverse alignment of the tape and the recording gaps 18. The tape 19 preferably is biased into contact with the recording face of the recording head 13, so as to provide for a substantially uniform magnetic intensity of the bits recorded by all of the channels of the multi-channel recording head. This biasing of the tape 19 may conveniently be provided by a pad 23 of any suitable material, such as felt, which is mounted on and resiliently biased toward the face of the recording head 13 by a resilient leaf spring 24 adjustably secured to the casing 15 of the recorder by a retaining screw 25.

The tape is adapted to be collected on a suitable take-up reel 26 simultaneously with its advance across the recording head 13. Preferably, the take-up reel 26 provides for drawing the tape 19 across the recording head from the pay-out reel 20, thereby to maintain a substantially uniform advance of the tape during all parts of its movement from the pay-out reel to the take-up reel. If desired, a suitable structure can be provided for exerting a slight drag on the pay-out reel, which may take the form of a friction brake resisting turning of the pay-out reel, so that the tape 19 will remain taut between the pay-out reel 20 and the recording head 13. Since the tape is being drawn across the head by the take-up reel 26 and is held in contact with the recording face of the head 13 by the flexibly biased pad 23, the portion of the tape 19 between the head 13 and the take-up reel 26 will inherently remain substantially taut. This assures against undesirable looseness in the tape as it traverses the recorder.

The symbols entered by the multi-channel recording head 13 on the magnetic tape corresponding to the buttons 1–9, 0, EOW, and ERROR may be conveniently coded into a modified binary code, as shown in FIG. 8, by the four channels of the recording head. Channels 27, 28, 29, and 30 may be used to designate respectively the digits 1, 2, 4, and 8. As can be readily understood this combination of channels provides a convenient arrangement for converting a decimal digit system into a modified binary numeric system through the proper energization of the respective coils in the different channels by the keys of the keyboard matrix.

As illustrated in FIG. 8, a magnetic bit in the channel 27′ of the tape 19 corresponding to the channel 27 of the recording head 13, if recorded alone on the tape, provides a symbol representative of the digit 1. Similarly, a magnetic bit, if recorded alone in a channel 28′ on the magnetic tape 19 corresponding to the channel 28 of the recording head, provides a symbol representative of the digit 2. A combination of bits on the magnetic tape in channels 27′ and 28′ provides a symbol representative of the digit 3. Likewise, a magnetic bit, if recorded alone in a channel 29′ on the magnetic tape 19 corresponding to the channel 29 of the recording head, provides a symbol representative of the digit 4. In like manner, a combination of bits on the magnetic tape in channels 27′ and 29′ provides a symbol representative of the digit 5. In the same manner, a combination of bits on the magnetic tape in channels 28′ and 29′ provides a symbol representative of the digit 6. By recording bits in all three of the channels 27′, 28′, and 29′, a symbol representative of the digit 7 is obtained. Finally, a single bit recorded in the channel 30′ on the magnetic tape, corresponding to the channel 30 in the recording head, provides a symbol representative of the digit 8, and a recording of bits in channels 27′ and 30′ provides a symbol representative of the digit 9. A combination of bits in channels 28′ and 30′; that is, a combination of the symbols representative of the digits 2 and 8, may be used to provide a symbol for 0 or 10. A suitable symbol for recording an end of a word can be provided by recording bits in the tape channels 29′ and 30′; that is, combining the symbols representative of the digits 4 and 8, and an error symbol can be provided by recording bits in channels 28′, 29′, and 30′ on the magnetic tape; that is, by a combination of bits representative of the digits 2, 4, and 8.

The movement of the tape 19 across the recording head 13 may be obtained by a suitable drive of the reel assembly in any conventional manner, either by manually actuating the take-up reel 26 or by driving this reel through a suitable source of power. Since the reel assembly is a relatively light structure and the restraints exerted on the tape 19 as it is drawn from the pay-out reel 20 and is wound on the take-up reel 26 are relatively light, the power necessary to drive the reel assembly is very small. In the recorder shown in FIG. 1, an electric motor 31 is provided having a shaft 32 which extends through the casing 15 and is mechanically connected to the take-up reel 26 so as to drive this reel for actuating the tape and the reel assembly. As has been previously described, the tape is adapted to be advanced at substantially predetermined step or extent across the face of the recording head 13 during each complete recording cycle.

In order to assure a lightweight portable recorder unit, the motor 31 may conveniently be a small direct-current motor which can be operated by a relatively small electric battery 33. One terminal 34 of the motor 31 may be permanently grounded or connected directly to the positive terminal of the battery 33, and the other terminal 35 of the motor 31 is adapted to be connected to the negative terminal of the battery through suitable starting and running circuits by any symbol switch of the keyboard 10 to provide for recording a symbol by the recording head. In the A.C. recorder shown in FIG. 1, the negative terminal of the battery 33 is connected to a bus line 36 which extends from the recorder through the connecting cable 12 and into the keyboard 10. Each of the symbol switches of the keyboard 10 is provided with a contact electrically connected to the bus line 36. A second bus line 37 extends from the keyboard 10 through the cable 12 into the recorder 11, in which it is connected to a pair of contacts 38 and 39 of a relay 40. Each of the symbol switches of the keyboard 10 also is provided with a contact electrically connected to the bus line 37, so that depression of any of the symbol switches closes a circuit between the bus lines 36 and 37 and connects the relay contacts 38 and 39 to the negative terminal of the battery 33 through these bus lines.

When the relay 40 is in its deenergized position, which corresponds to the complete deenergization of the recording system with all of the symbol switches open, a contactor 41 of the relay 40 closes a circuit between relay contacts 38 and 42. This latter contact 42 is connected to a line 43 connected to the motor terminal 35, to an oscillator 44, and to a line 45, which latter is connected to an indicating light 46, preferably mounted on the keyboard 10, and to amplifiers 47, 48, 49, and 50. This provides circuitry such that whenever any of the symbol switches of the keyboard 10 is closed, the motor 31 is energized through its terminal 34, connected directly to the positive terminal of the battery 33, and its terminal 35, connected through line 43, contact 42, contactor 41, contact 38, line 37, the symbol switch which has been closed, and line 36 to the negative terminal of the battery 33. A starting circuit for the motor is thus completed which energizes the motor and starts operation of the reel assembly and movement of the magnetic tape 19 across the face of the recording head 13.

During this initial advance of the tape 19, none of the coils of the channels of the recording head is energized, so that no recordation takes place. Simultaneously, with the energization of the motor 31 through the closure of a symbol switch by the completion of the starting circuit through the relay contactor 41, the oscillator 44 and the amplifiers for the various channels of the recording head are connected to the battery 33, thereby readying the oscillator and amplifiers for operation as soon as a signal is transmitted thereto through the relay 40 and the respective closed symbol or digit switch.

Figure 4:
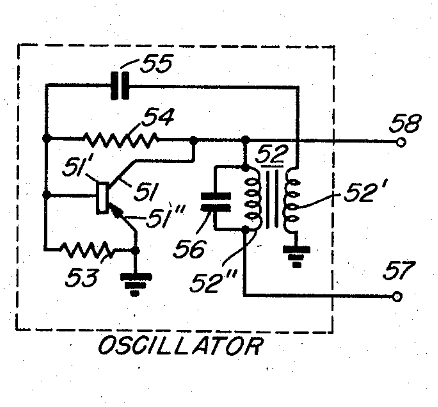
FIG. 4 is a schematic diagram of a suitable oscillator for use in an alternating-current recorder such as that shown in FIG. 1.

The oscillator 44 may be of any suitable type, such as that shown in FIG. 4. The illustrated oscillator utilizes a transistor with an inductive feedback from the transistor collector 51 to its base 51' by way of a tickler coil 52, and is provided with suitable biasing resistors 53 and 54 between the transistor base 51' and its emitter 51'' and collector 51, respectively. A condenser 55 is connected between the transistor base 51' and the secondary 52' of the tickler coil for maintaining the effectiveness of the biasing resistors by preventing substantially short circuiting of them by the low resistance of this tickler transformer coil secondary 52'. The tickler coil primary 52'' is shunted by a condenser 56 to provide a resonant circuit for the desired frequency of oscillation of the oscillator 44. This oscillator is merely illustrative of one suitable for carrying out the present invention, and its details are not per se a part of this invention.

After the motor 31 has operated, as indicated by the arrow 59, FIG. 1, for a predetermined amount, a pair of commutator segments 60 and 61 mounted on suitable insulating supports 60' and 61', respectively, driven by the motor shaft 32 will come in contact with pairs of brushes 62 and 63, respectively. The pair of brushes 62 completes a circuit through the commutator segment 60 from the negative terminal of the battery 33 to the motor terminal 35, thereby providing a motor energizing circuit independent of and parallel with the starting circuit for a cycle of operation, whereby the motor is assured of completing a predetermined cycle of operation and of advancing the magnetic tape 19 a substantially predetermined step or extent across the recording head 13. With this arrangement, as the motor reaches the end of the desired operating cycle, the commutator segment 60 passes out from under the pair of brushes 62, thereby opening the motor energizing circuit through these brushes and stopping the motor.

Simultaneously with the closure of the motor energizing circuit through the commutator segment 60 and the pair of brushes 62, recordation is initiated by completion of another circuit by the commutator segment 61 through the pair of brushes 63 which connects the negative terminal of the battery 33 to a terminal 64 of the coil 40' of the relay 40. This energizes the relay coil 40' which actuates the relay and opens the motor starting circuit through the relay contactor 41, thereby assuring deenergization of the motor 31 when its energization circuit through the commutator segment 60 and the pair of brushes 62 is broken at the end of an operating cycle. A condenser 40'' is connected across the relay coil 40' so as to minimize sparking at the relay contacts 72 and 39, at brushes 63, and also at the keyboard contacts should these latter be opened prematurely when the coil is disconnected through the brushes 63 at the completion of an operating cycle.

In addition, actuation of the relay 40, in response to the energization of its coil 40', impresses the voltage of the oscillator terminal 58 on the common terminals 58' of the amplifiers 47, 48, 49, and 50 through a relay contactor 65 which closes a circuit through relay contacts 66. The amplifiers are connected between the oscillator and the various track coils of the multi-channel recording head 13 in order to assure a sufficiently high voltage on these coils to provide the desired impulse for recording on the magnetizable memory member.

Figure 5:
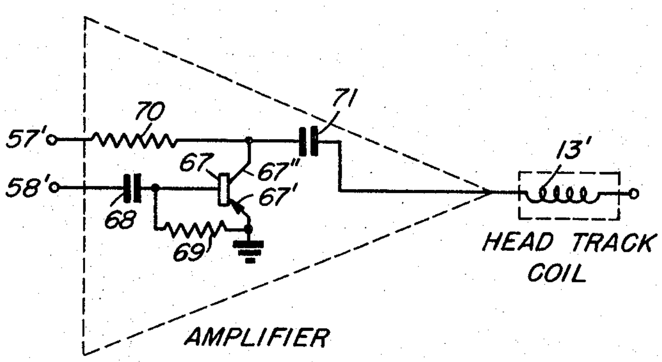
FIG. 5 is a schematic diagram illustrating an embodiment of a suitable amplifier for use in an alternating-current recorder such as that shown in FIG. 1.

Any suitable amplifier can be used for this purpose, such as that shown in FIG. 5. The illustrated amplifier is of the common-emitter transistor type in which the signal is capacitively coupled to the base 67 of the amplifier transistor by a suitable condenser 68. A suitable biasing resistor 69 is connected between the transistor base 67 and its emitter 67' in order to assure the desired forward bias of the emitter-base PN junction. A biasing resistor 70 also is connected between a terminal 57' of the amplifier and the transistor collector 67'' in order to provide the desired reverse bias to the collector-base circuit. The amplifier terminal 57' is connected to the negative terminal of the battery 33, FIG. 1, during the starting of an operating cycle through the conductors 36 and 37 when a keyboard switch is closed by being connected thereto through the relay contactor 41. During the recording portion of the cycle, the amplifier terminal 57' is connected to the negative terminal of the battery 33 in the same manner as the motor and the oscillator through the circuit which is completed by the engagement of the commutator segment 60 with the pair of brushes 62. In this manner, the amplifier terminal 57' is always connected to the negative terminal of the battery 33 during an entire operating cycle.

As shown in FIG. 5, the amplifier output is connected to its respective track or channel coil 13' of the multichannel recorder head 13 by a capacitive coupling through a suitable condenser 71, which assures against the possible damaging flow of direct current through the amplifier. As in the case of the oscillator, this amplifier is merely illustrative of one suitable for use with this invention, and its details do not per se comprise a part of the invention.

Energization of the relay coil 40', FIG. 1, through the commutator segment 61 and the pair of brushes 63, as has been explained, actuates the relay 40, so that the relay contactor 41 opens the motor starting circuit through the relay contacts 38 and 42 and closes a relay holding circuit through relay contacts 39 and 72. This holding circuit extends from the relay coil terminal 64 through the contact 72, contactor 41, contact 39, and the bus lines 37 and 36 to the negative terminal of the battery through the symbol switch of the keyboard which has been depressed and closed. In this manner, even though the operating cycle is completed, such that the commutator segment 61 is moved out of contact with the pair of brushes 63 so as to open the normal energizing circuit for the relay coil 40' through the pair of brushes 63, as long as a symbol switch remains closed, the relay coil 40' will remain energized. This forms a blocking circuit which assures that the motor starting circuit through the relay contactor 41 will remain open so that the motor cannot be restarted until the symbol switch which was closed has been released to its open circuit position; that is, until all symbol switches are open, thereby to deenergize the relay coil 40' through contactor 41 and the relay contacts 72 and 39 in its holding circuit. This also provides for nonenergization of the oscillator 44 and the amplifiers 47, 48, 49, and 50, whereby the recording head is deenergized prior to stoppage of movement of the magnetic tape over the recording head.

With this system, any digit or instruction can be recorded on the magnetizable memory member, such as magnetic tape, by depression of one of the symbol switches on the keyboard 10, which will energize the motor 31 by the battery 33 through the motor starting circuit which includes the bus lines 36, 37, the relay contacts 38 and 42, and the relay contactor 41. As the motor operates, the magnetic tape will be advanced over the recording face of the recording head 13 by the actuation of the take-up reel 26, and the oscillator 44 and the amplifiers will be readied for operation. Continued operation of the motor 31 will provide for energization of the motor through the circuit including the commutator segment 60 and the pair of brushes 62, while the relay coil 40' is simultaneously energized through the commutator segment 61 and the pair of brushes 63 so as to actuate the relay 40. This closes the relay holding circuit through the relay contacts 39 and 72 and the contactor 41 and simultaneously applies a signal to the amplifiers 47, 48, 49, and 50 from the oscillator 44 through the relay contactor 65 and contacts 66. The track coil, or coils, in the channel, or channels, of the recording head selected in accordance with the symbol switch of the keyboard which has been closed is thereby energized and provides for a recordation of the desired magnetic bit or bits on the magnetizable memory member as it is advanced over the face of the recording head. During the energization of the motor 31, the signal light 46 is energized, as it is connected in parallel with the terminals 34 and 35 of the motor, and it thereby provides an indication that an operating cycle is in progress. Thus, whenever an entry is to be made on the magnetizable memory member, the symbol switch should be held closed until such time as the signal light 46 is extinguished. This assures a complete entry of the symbol for each closure of a symbol switch.

In order to assure against a possible erroneous recordation due to the simultaneous depression of more than one symbol switch, a simple latching mechanism can be provided on the keyboard. FIGS. 2 and 3 illustrate such a modification of the keyboard. As shown in these figures, each symbol switch may include a button 73 mounted on an operating stem 74 connected to a switch contactor 75. The contactor 75 is insulated in any suitable manner from the switch stem 74, as by an insulating mounting 74', so as to prevent grounding of the circuits through the switch operating mechanism. Each symbol switch is biased to its open circuit position in any suitable manner, as by a compression spring 76 arranged between the base of the button 73 and a suitable plate 77, which may be the cover of the keyboard 10. An arrangement is provided which is responsive to the closure of any of the symbol switches on the keyboard 10 for latching the switch which has been closed in its closed position until completion of a recording cycle and for release of the switch to its open position upon the completion of a cycle of operation of the recorder.

This arrangement includes a latching plate or bar 78 which is provided with slots or apertures 79 therein through which the stems 74 of the various symbol switches extend. Each switch stem 74 is formed with a boss 80 thereon which projects to one side of the stem over its respective slot 79 through which it can freely pass. The compression spring 76 normally biases the boss 80 to a position over the plate 78 and under the plate 77, as shown in FIG. 2. Preferably, the boss 80 is formed with a tapered face 80' such that the lower side of the boss is somewhat smaller than the upper side thereof so as to facilitate passage of the boss through its respective slot 79 after the lower face thereof has entered the slot. The latching plate 78 is adapted to be biased in one direction by any suitable means, such as a tension spring 81, which normally will align the slots 79 in the latching plate under the respectively associated bosses 80 of the various symbol switches, as shown in FIG. 2.

Whenever a symbol switch is depressed to its closed position, as indicated by switch 1 in FIG. 3, the indicating light 46 is energized, as has been explained, and this provides for energization of a latching plate actuating member, which may conveniently comprise a solenoid 82 connected directly in parallel with the indicating light 46. Thus, whenever a symbol switch is closed, the solenoid 82 is energized and draws the latching plate 78 against the action of the tension spring 81, so as to move the slots 79 from registry with the bosses 80 on the stems 74 of the various symbol switches to a position such as that shown in FIG. 3. Symbol switch 2 in this figure shows this relationship of the latching plate 78 and the open symbol switches and illustrates the manner in which the bosses 80 on the open symbol switches in cooperation with the plate 78 latch these switches in open position and prevent closure of such open switches. If it is attempted to close any such open symbol switch after one of the switches has been closed, the lower face of the boss 80 on such switch will engage the upper surface of the latching plate 78 and prevent depression and closure of such a switch.

Furthermore, when a symbol switch has been closed and the latching plate 78 has been drawn by the solenoid 82 to its latching position, the boss 80 on the closed switch, such as switch 1 in FIG. 3, extends below the latching plate 78, and the upper surface of the boss 80 engages the undersurface of the latching plate 78 so as to hold the depressed symbol switch in closed circuit position until such time as the operating cycle of the recorder is completed, as indicated by the deenergization of the indicating light 46. At this time, the solenoid 82 is deenergized and permits the tension spring 81 to draw the latching plate 78 to its unlatched position, such that the compression spring 76 of the closed symbol switch biases such switch to its open circuit position. FIGS. 2 and 3 schematically illustrate these details of the keyboard latching arrangement and are not intended to illustrate the actual structural features, which can be varied to suit the size and type of symbol switches and keyboard found most suitable for any particular application.

For many purposes a direct-current recorder may be found preferable to an alternating-current unit. FIG. 9 illustrates a direct-current recorder embodying the present invention. A keyboard 10, similar to that shown in FIG. 1, may be provided and operated in the same manner as with reference to the alternating-current recorder. This keyboard 10 can, of course, also be provided with the latching improvement illustrated in FIGS. 2 and 3, if so desired. Structurally the magnetizable memory member may be of the same type as that used with reference to the system shown in FIG. 1, and illustrated in detail in FIG. 6, and may comprise a magnetic tape 19 which is adapted to be moved across the recording face of a multi-channel recording head 13 and fed from a pay-out reel 20 and actuated through a take-up reel 26 in the same manner as illustrated in FIG. 6. Other details of the reel assembly and the magnetic recording head, as well as the modified binary code shown in FIGS. 6, 7, and 8, also may advantageously be used with this direct-current recorder.

In this recorder, the take-up reel 26 is adapted to be mounted on a motor shaft 32 and to be driven by a motor 31 during each operating cycle which is initiated by the closure of a symbol switch on the keyboard 10. Closure of one of the symbol switches energizes the motor 31 by a suitable battery 33 through a starting circuit. The negative terminal of the battery 33 is connected to the motor through bus lines 83 and 84 which are connected to each of the symbol switches and extend from the keyboard 10 to the direct-current recorder. These bus lines may conveniently form part of a suitable plug-in connecting cable 85 when the keyboard is made separate from the direct-current recorder. The bus line 84 extends from the keyboard 10 to contacts 86, 87, and 88 of a relay 89, and, in the normally deenergized position of the relay 89, the contacts 87 and 88 are open circuited, and the contact 86 is connected through a relay contactor 90 to a contact 91 which is connected to a terminal 92 of the motor 31 and through a line 93 to a terminal of an indicating light 46, preferably located on the keyboard 10. The motor starting circuit is completed by connection of the positive terminal of the battery 33 to a contact 94 of the relay 89 and through a relay contactor 95 and contact 96 connected to the other motor terminal 97. This also connects the other terminal of the indicating light 46 of the positive battery terminal through a conductor 93' and to the other motor terminal 97. Thus whenever a symbol switch on the keyboard 10 is depressed to its closed position, the motor 31 is energized through its starting circuit, so that the motor shaft 32 drives the take-up reel 26 and draws the magnetizable memory tape member 19 across the face of the multi-channel recording head 13. The indicating light 46 also is energized and thereby shows that the motor is energized.

During this initial advance of the magnetizable memory member, no recordation takes place; however, as the motor continues to operate in the direction indicated by the arrow 98, commutator or switching segments 99 and 100, mounted on suitable insulating supports 101 and 102 driven by the shaft 32, are rotated until these commutator segments respectively engage pairs of brushes 103 and 104. When commutator segment 100 engages the pair of brushes 104, it completes an energizing circuit from the negative terminal of the battery 33 to the terminal 105 of the relay coil 89', through this coil to the positive terminal of the battery. Such energization of the relay coil 89' causes actuation of the relay, which moves a contactor 107 into engagement with contact 88 and another contact 108, so as to connect the motor terminal 92 through these contacts to the bus line 84, the closed symbol switch on the keyboard 10, and through the bus line 83 to the negative terminal of the battery 33. This circuit provides an energization circuit for the motor 31 which assures continued operation thereof as long as the relay 89 is energized.

Actuation of the relay 89 in response to the energization of its coil 89' after the motor 31 has rotated the commutator segment 100 into contact with the pair of brushes 104, closes a circuit which energizes the recording head to provide the desired symbol recordation on the magnetic tape 19. This recording head energizing circuit extends from the negative terminal of the battery 33, through the bus line 83, the closed symbol switch on the keyboard 10, to one of the lines 111, 112, 113, or 114, or a combination of these, and a terminal or terminals of the selected channel or channels, depending upon the symbol switch which has been closed. The other terminal of the four channels of the multi-channel recording head are connected to a common line 115 which leads to a contact 116 of the relay 89. When the relay 89 has been actuated by its energization through the commutator segment 100 and the pair of brushes 104, the relay contactor 95 closes a circuit between the relay contact 116 and a relay contact 117 through the line 93' to the pair of brushes 103 in contact with the commutator segment 99 to the positive terminal of the battery 33. This provides an energizing circuit for the respective selected channel or channels of the multi-channel recording head 13 so as to produce the desired recordation of a bit or bits on the magnetic tape 19 corresponding to the symbol switch on the keyboard 10 which has been closed.

A relay holding circuit extends from the negative terminal of the battery 33, through the bus line 83, the closed symbol switch on the keyboard 10, and the bus line 84 to relay contact 87. This relay contact 87 is adapted to be connected by the contactor 90 to a relay contact 109, and through a line 110 to the relay terminal 105. This provides parallel circuits between the negative terminal of the battery 33 and the relay terminal 105 by the circuit through the closed symbol switch of the keyboard 10 and the relay holding circuit, including line 110, and the circuit through the pair of brushes 104 and the commutator segment 100. In this manner, after the motor 31 has driven the shaft 32 so as to complete circuits through the commutator segments 99 and 100 and their respective pairs of brushes 103 and 104, the operating cycle of the recorder motor will be completed regardless of whether or not the symbol switch on the keyboard 10 is held closed to the end of the cycle or is prematurely opened. In order to complete the recording cycle, the symbol switch on the keyboard should be held closed to the end of the operating cycle of the motor 31, as whenever the symbol switch of the keyboard which initiated the operating cycle is opened, all channels of the recording head are deenergized and recordation ceases. An operator should, therefore, keep the symbol switch of the keyboard depressed to its closed position until the signal light 46 is extinguished, as this will indicate that the motor 31 has been deenergized and its operating cycle completed, thereby assuring a complete recordation for each operating cycle of the motor 31.

In order to assure against accidental repeated recordings of the same symbol when only one recordation is desired, the relay holding circuit will maintain the relay coil 89' energized as long as a symbol switch on the keyboard is closed after the relay has once been actuated by energization of its coil through the commutator segment 100 and the pair of brushes 104. If an operator should hold a symbol switch closed after the indicating light 46 has been extinguished, no repetition of the recording will take place, as the energizing circuit of the motor 31 is opened by the rotation of the commutator segment 99 from contact with the pair of brushes 103 and its starting circuit is held open by the continued energization of the relay 89 by its holding circuit, while all channels of the recording head 13 are concurrently deenergized by the opening of the circuit through the pair of brushes 104 and the commutator segment 100. The relay holding circuit therefore provides an effective blocking circuit which prevents accidental repeated recording of a symbol because a symbol switch has been held closed after the indicating light has been extinguished. A condenser 106 preferably is connected across the relay coil 89' so as to minimize burning of the contacts 109 and 87 of the relay, and of the keyboard contacts should these be opened prematurely, and also minimize sparking at the brushes 104 when the coil 89' is deenergized. In this manner, recordation of the desired symbols on the magnetic tape 19 by discrete bits, such as those shown in FIG. 8, can be conveniently and assuredly provided by the simple small D.C. recorder and keyboard shown in FIG. 9.

FIG. 10 illustrates another embodiment of a direct-current magnetic digital recorder embodying the present invention wherein the keyboard is similar to those shown in FIGS. 1 and 9 with a slight simplification to adapt it for use with a simplified D.C. recorder illustrated in this figure. This type of magnetic digital recorder may also include structural features such as those illustrated in FIGS. 2, 3, 6, and 7, if desired. The physical details illustrated in the latter two figures provide convenient and simple tape transport and recording head features which are especially useful in a light-weight recorder of the type shown in FIG. 10.

The direct-current recorder schematically illustrated in this figure is adapted to utilize the magnetizable memory tape member transport means shown in FIG. 6 for the purpose of moving this magnetizable member a substantially predetermined extent across the recording head for each complete recording cycle, as in the previously described embodiments of this invention. In this embodiment, however, the energization of the multi-channel recording head is adapted to be provided for any closure of a symbol switch on a keyboard 120 while the magnetizable member is stationary.

The advance of the magnetizable members is adapted to take place only after the respective channel, or channels, of a multi-channel recording head 121 has been energized. This provides for the recordation of bits in channels 27', 28', 29', and 30' of the magnetic tape member 19 which are relatively very small in length compared to those illustrated in FIG. 8. If the magnetizable tape member 19 were to be advanced across the recording head 121 to the same extent as in the recorders illustrated in FIGS. 1 and 9, the non-magnetized space between longitudinally adjacent bits would be many times that shown in FIG. 8 and many times that necessary for a suitable recording and reading of the digits and instructions represented by the bits on the tape. In the illustrated embodiment, provision is therefore made for reducing the step or advance of the magnetizable tape member across the recording head for each complete recording cycle by reducing the amount of rotation of the drive motor for each operating cycle.

Thus, as shown in FIG. 10, recordation of a symbol on the magnetizable memory member is initiated immediately when a symbol switch on the keyboard 120 is depressed to its closed position. This is obtained by completing a circuit from the positive terminal of a battery 122 through a line 123 to a common terminal 124 for all of the channels 125, 126, 127, and 128 of the multi-channel recording head 121. The other respective terminals of the channels 125, 126, 127, and 128 of the recording head are connected respectively by lines 129, 130, 131, and 132 to contacts 133, 134, 135 and 136 of relay 137 through relay contactors 138, 139, 140, and 141 to lines 142, 143, 144, and 145. These latter lines are connected to the various symbol switches of the keyboard 120 in the same manner as corresponding lines are connected to symbol switches in the keyboard 10 of FIGS. 1 and 9 to provide the desired bits on the magnetic tape 19 in accordance with any desired code, such as the modified binary code shown in FIG. 8. The lines 142, 143, 144, and 145 may extend directly to the keyboard 120 if it is mounted upon the D.C. recorder as a single physical unit, or may conveniently extend through a plug-in type connecting cable 146 which may extend between suitable sockets and plugs connecting the D.C. recorder unit circuits to corresponding circuits in the keyboard 120. The closed symbol switch of the keyboard 120 will connect one or more of the lines 142, 143, 144, and 145 to a bus line 147 to the negative terminal of the battery 122. In this manner, the respective channel, or channels, of the multi-channel recording head 121 is energized immediately on the closure of a symbol switch of the keyboard 120 and prior to the initiation of the advance of the magnetizable memory member.

During this recordation by the closure of a symbol switch on the keyboard 120, a circuit also is completed for advancing the magnetizable member. This circuit extends from the negative terminal of the battery 122 through the bus line 147 and the closed symbol switch to a line 147', to a terminal 148 of the coil 137' of the relay 137. The other terminal 149 of the relay coil 137' is connected to the positive terminal of the battery. Energization of the relay coil 137' actuates the relay 137 so that the contactors 138, 139, 140, and 141 open the circuits between the contacts 133, 134, 135, and 136 respectively, thereby deenergizing the channel, or channels, of the multi-channel head 121 which was energized by the closure of one of the symbol switches. This actuation of the relay 137 is adapted to close a circuit which provides for the advance of the magnetizable memory across the multichannel recording head 121. The relay contactor 138 may conveniently be used to close a circuit between contacts 154 on actuation of the relay 137, which closes an electrical starting circuit for a drive motor. This circuit extends from the negative terminal of the battery 122 through the bus line 147, the closed symbol switch on the keyboard 120, the line 147', through the relay contacts 154 and contactor 138 to a line 155 connected to a terminal 156 of a suitable driving motor 157, and the other terminal 158 of the motor 57 is connected through contacts 150 and contactor 151 of relay 152 to ground and the positive terminal of the battery 122. Thus, when the relay 137 is actuated so as to close a circuit between its contacts 154 by its contactor 138, the motor 157 is energized by the battery 122 and is adapted to drive the reel 26 through a suitable mechanical connection, such as a motor shaft 159 and to advance the magnetic tape across the recording head.

Energization of the motor 157 will cause it to rotate in a direction, such as that indicated by the arrow 160, so as to drive a pair of commutator or switching members which comprise suitable insulating mounting members 161 and 162, on which commutator segments 163 and 164 respectively are mounted. A pair of brushes 165 is connected between the motor terminal 158 and the positive terminal of the battery 122 so that when the commutator mounting member 161 is rotated and carries one of the commutator segments 163 into contact with the pair of brushes 165, a circuit is completed from the positive terminal of the battery 122 to the motor terminal 158 so as to energize the motor through this circuit in parallel with the starting circuit through the contacts 150 and contactor 151 of the relay 152. This provides for maintaining energization of the motor 157 through the pair of brushes 165 and a commutator segment 163 as long as the relay 137 is energized so as to close the motor circuit through the relay contacts 154 and the contactor 138 regardless of whether or not the circuit through the contacts 150 and contactor 151 of the relay 152 is open or closed.

An indicating light 153, preferably on the keyboard 120, is connected across the motor terminals 158 and 156 through the contacts 154 and contactor 138 of relay 137, so that whenever the motor 157 is energized the light 153 will be on, thereby indicating to an operator that an operating cycle is in progress and that the symbol switch should be kept closed until the light goes out. This precaution is not, of course, necessary if the improvements of FIGS. 2 and 3 are incorporated in this type recorder keyboard.

Substantially concurrently with the completion of a circuit through the pair of brushes 165 by contact with a commutator segment 163 on rotation thereof, a circuit is completed to assure only a single recording for each closure of a symbol switch. This circuit extends from the negative terminal of the battery 122 through a pair of brushes 166 as it comes into contact with one of the commutator segments 164 on the mounting member 162 to a terminal 167 of a relay coil 152' of the relay 152. The other terminal 168 of the relay coil 152' is connected directly to ground and the positive terminal of the battery 122. Thus, when the motor 157 is energized and operates so as to complete its energizing circuit through the pair of brushes 165 in parallel with the circuit through the relay contacts 150, another circuit is concurrently closed through the pair of brushes 166 and a commutator segment 164 which energizes the relay coil 152' so as to actuate the relay 152 to open the motor starting circuit between the contacts 150. Such actuation of the relay 152 also is adapted to close a holding circuit which will keep its coil 152' in energized condition as long as one of the symbol switches on the keyboard 120 is closed. This forms a blocking circuit which prevents a repeated recording of any given symbol without a correspondingly repeated opening and closing of the symbol switch. Such a blocking circuit can conveniently be provided by connecting the terminal 167 of the relay coil 152' to a contact 169 which is adapted to be electrically connected by the relay contactor 151 to a contact 170 connected by a line 171 through the closed symbol switch to the bus line 147 connected to the negative terminal of the battery 122. Thus, the relay 152 will remain energized through the blocking circuit as long as one of the symbol switches remains closed after it has been initially energized through the pair of brushes 166 and a commutator segment 164, even though motor 157 will have rotated the commutator mounting member 162 such that the pair of brushes 166 no longer contacts a commutator segment 164 whereby the circuit through the pair of brushes 166 has become opened.

Rotation of the motor 157 to a position wherein the circuit between the pair of brushes 166 is broken substantially concurrently opens the motor energizing circuit between the pair of brushes 165, as the commutator segment mounting member 161 also is rotated by the motor shaft 159, thereby deenergizing the motor. As previously explained, deenergization of the motor 157 through the pair of brushes 165, while the relay 152 is energized to a position wherein the relay contactor 151 opens the motor starting circuit between the contacts 150, also results in the deenergization of the indicating light 153, and indicates to the operator that the operating cycle of the recorder has been completed and that another symbol switch may be closed for the recordation of another digit or instruction on the magnetizable memory member.

By providing a plurality of commutator segments 163 and 164 as indicated in FIG. 10, the extent of advance or step of the magnetizable memory member across the recording head for each complete recording cycle is correspondingly decreased over the advance of such a member by the embodiments illustrated in FIGS. 1 and 9, although one or any desired number of segments could be used, consistent with the pack density of the bits which properly can be handled by the interpreter or computer in which the recorded data is to be processed. This embodiment, therefore, provides for a much more economical utilization of the magnetizable memory member and thereby further decreases the total size and weight necessary for the recordation of a given amount of information. A condenser 172 preferably is connected across the relay coil 152′ so as to minimize burning of the contacts 151, 169, and 170 of the relay and of the keyboard contacts should these be opened prematurely, and also to minimize sparking at the brushes 166 when the coil 152′ is deenergized.

The FIG. 10 embodiment of the present invention can be further simplified in order to provide a more compact recorder by simply providing means for energizing the multi-channel recording head 121 through a relay connected in the line which is common to all of the channels of the recording head rather than a relay such as relay 137, FIG. 10, which has separate contacts connected to each of the channels of the recording head. Such a simplified embodiment is illustrated in the fragmentary schematic diagram shown in FIG. 11.

In this illustration, all of the parts which are the same as those in FIG. 10 are shown with the same reference numerals and operate in the same manner as in FIG. 10. The present improvement involves the substitution of relay 137*a* and its connections, FIG. 11, for the relay 137 and its connections, FIG. 10. The relay 137*a* is provided with a coil 137*a*′ having terminals 148 and 149 which are connected in the same manner as relay coil 137′ in FIG. 10 and is adapted to be energized in the same manner. The relay 137*a* is provided with contacts 154 connected lines 147′ and 155 in the same manner as these are connected in FIG. 10, so as to provide for connecting and disconnecting the motor terminal 156 through a closed symbol switch on the keyboard 120 to the negative terminal of the battery 122.

The common terminal 124 of all of the channels 125, 126, 127, and 128 of the recording head is connected to the positive terminal of the battery 122 through line 123*a*, relay contacts 173, contactor 138*a*, and line 174. The separate terminals of each of the channels 125, 126, 127 and 128 of the recording head are respectively connected directly by lines 142, 143, 144 and 145 to the respective symbol switches of the keyboard 120, thus eliminating the multiple contacts and contactors of the relay 137 connected in these latter lines in the FIG. 10 system.

Closure of any of the symbol switches connects the negative terminal of the battery 122 to the respective channel or channels of the recording head, as in the FIG. 10 device, and the other terminal of the respective channel or channels is connected to the positive terminal of the battery 122 through the line 123*a*, the relay contacts 173, contactor 138*a*, and line 174. This produces a recordation of the desired bit or bits on the magnetizable tape member 19 during the time required for the energization and operation of the relay 137*a*.

Subsequent to such recordation, this relay is actuated by the energization of its coil 137*a*′ to a position wherein the contactor 138*a* closes the motor starting circuit by connection of its terminal 156 through the line 155, relay contacts 154, contactor 138*a*, and the closed symbol switch to the bus line 147 connected to the negative terminal of the battery 122. This results in the complete deenergization of the recording head 121 by opening its circuit through the relay contacts 173, and the motor operates in the same manner as has been explained with reference to FIG. 10 to provide a blank space between longitudinally adjacent discrete bits on the magnetizable tape member.

Each of the direct-current recorders of FIGS. 10 and 11 can readily be modified in accordance with the disclosure in FIG. 1 to provide alternating current units, if desired. A suitable oscillator and amplifiers, such as those shown in FIGS. 4 and 5, can be connected into the FIGS. 10 and 11 systems to convert these into alternating current arrangements.

FIG. 12 illustrates another embodiment of another direct-current magnetic digital recorder embodying the present invention wherein the keyboard may be the same as that shown in FIG. 10. As in the other recorders, the keyboard may be a separate unit connected to the recorder by a suitable plug-in connecting cable or may be made an integral part of the recorder. Furthermore, this recorder and its keyboard may also include structural features such as those illustrated in FIGS. 2, 3, 6, and 7, if desired. Any suitable magnetizable memory member may be used with this recorder and preferably a magnetizable tape is used together with a transport means similar to that shown in FIG. 6.

In this arrangement, the recording and the advance of the magnetizable tape across a recording head for each complete recording cycle is performed in a manner similar to that of the device illustrated in FIG. 9 in that the recording takes place during movement or advance of the magnetizable tape across the recording head. Blank spaces between longitudinally adjacent discrete bits on the magnetizable tape may be formed by additional advance of the tape either before or after the magnetic recording takes place. Preferably, the tape is thus additionally advanced prior to the recordation in each instance.

In this system, the take-up reel 26 which advances the magnetizable memory tape member is adapted to be mounted on a motor shaft 175 driven by a suitable motor 176 during each operating cycle which is initiated by the closure of a symbol switch on a keyboard 120. Closure of any one of the symbol switches energizes the motor 176 by a battery 177 through a suitable starting circuit. This starting circuit includes connecting a terminal 178 of the motor through a line 179, the closed symbol switch on the keyboard 120 to the bus line 147 which is connected to the negative terminal of the battery 177. This energizes the motor 176, as the positive terminal of the battery 177 is connected through relay contacts 181 and a contactor 182 of relay 183 to the other terminal 184 of the motor. This does not energize the multi-channel recording head 185 but drives the motor so as to advance the magnetizable tape member 19 across the head and provides a blank space which is adapted to separate longitudinally adjacent discrete bits recorded on the tape.

The motor 176 is adapted to rotate, as indicated by the arrow 186, and to drive the shaft 175 so as to rotate a pair of switching or communicating members which control the operating cycle of the recorder. These commutating members comprise suitable insulating mounting members 187 and 188 on each of which is mounted a pair of commutator segments 189 and 190, respectively. After a predetermined rotation, one of the commutator segments 189 contacts a pair of brushes 191 which completes a motor energizing circuit in parallel with the relay contacts 181 and contactor 182, connecting the motor terminal 184 to the positive terminal of the battery 177. This assures continued energization of the motor through this parallel circuit as long as one of the commutator segments 189 remains in contact with the pair of brushes 191 and one of the symbol switches on the keyboard 120 is held closed.

Simultaneously, with the completion of the energizing circuit through the pair of brushes 191, one of the commutator segments 190 engages a pair of brushes 192 which connects the negative terminal of the battery 177 to a terminal 193 of a coil 183′ of the relay 183. This energizes the coil 183′, since its other terminal 194 is connected directly to ground and to the positive terminal of the battery 177. Such energization of the coil 183′ actuates the relay 183 so as to open the starting circuit of the motor through the relay contacts 181 and closes an energizing circuit to the multi-channel recording head 185. This recording head circuit may conveniently be closed through a pair of contacts 195 of the relay 183 by the contactor 182, which connects a common terminal 196 of channels of the multi-channel recording head 185 to the positive terminal of the battery 177 through the energizing circuit including the pair of brushes 191 and the commutator segment 189 in contact therewith. The specfic channel, or channels, of the recording head which is energized to provide the discrete magnetized bit on the tape 19 depends upon the symbol switch which is closed on the keyboard 120, as in the other embodiments of this invention. These symbol switches may represent digits or instructions in the same manner as has been explained with reference to keyboard 10 of FIG. 1 and the bits shown in FIG. 8.

The actual structure of the recording head may be similar to that shown in any of the other embodiments of this invention and includes channels 125, 126, 127, and 128, each of which is suitably connected directly to the various symbol switches of the keyboard 120 respectively by conductors 142, 143, 144, and 145, as has been explained with reference to the arrangement shown in FIG. 11. Also, the keyboard 120 may be mounted directly on the recorder as a part thereof or may be made as a separate unit and connected to the recorder by any suitable means, such as a plug-in type connecting cable 146.

In order to assure a complete recording cycle for each symbol to be entered on the memory member, it is desirable that the operator should hold closed the symbol switch representing the recordation which is desired. Such operation is facilitated by the provision of an indicating light 153 connected across the terminals 178 and 184 of the motor 176, so that whenever the motor is energized the symbol light 153 is lit, thus indicating that an operating cycle is in progress.

A substantially uniform length of bit in each of the channels 27′, 28′, 29′, and 30′, FIG. 8, of the magnetizable tape 19 is assured for each recordation of such bits by energization of the respective channel or channels of the recording head 185 for an advance of the tape across the recording head corresponding to a substantially predetermined fraction of the step or length of advance of the tape for each complete operating cycle. This is obtained by deenergizing the parallel energizing circuit of the motor 176 through the pair of brushes 191 as the commutator segment 189 passes out of contact with this pair of brushes. A holding circuit is provided through a pair of relay contacts 197 and a contactor 198 which connect the relay coil terminal 193 to the line 179. This circuit assures that once the relay 183 has been actuated by energization of its coil 183′, it will remain energized as long as a symbol switch is held in closed position. This prevents accidental restarting of the motor 176, as it holds open the motor starting circuit between the relay contacts 181 until such time as the relay coil 183′ has been deenergized. Thus, the relay holding circuit forms a blocking circuit which limits energization of the tape advancing motor 176 to a single operating cycle until all of the symbol switches are open, even though the motor 176 may have come to rest by passage of one of the commutator segments 189 out of contact with the pair of brushes 191 and even though the indicating light 153 thereby has been extinguished. A condenser 198′ preferably is connected across the relay coil 183′ so as to minimize burning of the relay contacts 197 and 198 and of the keyboard contacts should these latter be opened, prematurely, and also to minimize sparking at the brushes 192 when the coil 183′ is deenergized.

This provides a simplified direct-current recorder wherein the recordation takes place as the magnetizable memory member is advanced over the recording head and assures a substantially uniform size bit and spacing between discrete bits in all of the tracks of the magnetizable memory member. Furthermore, as shown in this embodiment, the magnetizable memory member may be used more efficiently by reducing the fraction of tape advance used for each bit, or at least by reducing the spacing between adjacent discrete bits by the provision of a plurality of commutator segments on each of the commutator members which connect and disconnect the recording head to its source of energization for each recording cycle. A single commutator segment or more than two for each commutator member can equally well be used if desired.

This recorder also utilizes a simplified switching circuitry through the relay of the recorder over that shown in FIG. 9, and, in some instances, may be found preferable to the FIG. 9 arrangement.

FIG. 13 illustrates a further embodiment of the present invention similar to that shown in FIGS. 10, 11, and 12, but wherein the recorder is of the alternating-current type and utilizes alternating-current components similar to the recorder schematically illustrated in FIG. 1. This type of magnetic digital recorder also may include structural features such as those illustrated in FIGS. 2, 3, 6, and 7, if desired.

In this arrangement, a keyboard 120, similar to that shown in FIG. 10, can be used and may be made integral with the recorder or as a separate unit which may be conveniently connected to the recorder by a suitable plug-in type connecting cable 146. As in the devises illustrated in FIGS. 10, 11, and 12, the various symbol switches of the keyboard may be connected to channels 200, 201, 202, and 203 of a multi-channel recording head 204 by lines 142, 143, 144, and 145, respectively. A bus line 147 connects to the negative terminal of a suitable battery 177, as in the arrangement shown in FIG. 12, and is adapted to be connected to a terminal 178 of a tape transport reel driving motor 176 by closure of any of the symbol switches of the keyboard 120 through the line 179. The A.C. recorder also is substantially the same as the D.C. recorder shown in FIG. 12, except that it is adapted to alternating-current energization of the recording head 204. All of the driving and switching elements in the recorder are substantially the same as those shown in FIG. 12 and operate in the same manner as those of the device shown therein. The same reference numerals refer to the same parts in the two figures in order to facilitate an understanding of their similarity.

With an alternating-current recorder of the type illustrated, energization of the various channels in the recording head 204 is adapted to be provided by signals originating in an oscillator 205 which are amplified by one of the amplifiers 206, 207, 208, or 209, and transmitted respectively to the recording channels 200, 201, 202, or 203 of the recording head. The oscillator 205 and the amplifiers may be of the type disclosed in FIGS. 4 and 5 and connected in the recorder system in the same manner as the oscillator and amplifiers of FIG. 1.

As in the other embodiments, a recording cycle is initiated by closing a symbol switch on the keyboard 120. This connects the negative terminal of the battery 177 through the bus line 147, the closed symbol switch, and the line 179 to an indicating light 153, the terminal 178 of the motor 176, and to the oscillator 205. The positive terminal of the battery 177 is connected through a pair of relay contacts 181 and a contactor 182 to a line 210 connected to the motor terminal 184 so as to complete a starting circuit for the motor 176. This also connects the positive terminal of the battery 177 to the oscillator 205 and to the four amplifiers 206, 207, 208, and 209 so as to ready the oscillator and the amplifiers for sending the signal impulse to the channel or channels of the recording head 204 selected by closure of one of the keyboard symbol switches. The line 210 also is connected to the indicating light 153, so that whenever the motor terminals 178 and 184 are connected for energization by the battery 177, the indicating light 153 will be lit, thereby providing notification to an operator of the device that an operating cycle is in progress.

Closure of the motor starting circuit will cause the motor 176 to operate, as indicated by the arrow 186, so as to drive the commutator or switching members through a shaft 175 and simultaneously drive the take-up reel 26 of the magnetic tape transport mechanism. This will advance the magnetic tape 19 across the recording head and provide a blank space before the recordation of a bit on the tape. This rotation of the motor 176 also advances commutator segments 189 mounted on a suitable insulating support 187 driven by shaft 175 until one of the commutator segments 189 contacts the pair of brushes 191. This completes an electrical circuit from the positive terminal of the battery 177 to the motor terminal 184, thereby providing an energizing circuit for the motor in parallel with the circuit through the relay contacts 181 and the contactor 182 of the relay 183.

Simultaneously therewith, commutator segments 190 are rotated, as they are carried by the insulating supporting member 188, until one of these segments contacts the pair of brushes 192 and connects the negative terminal of the battery 177 to the terminal 193 of the relay coil 183'. Since the other terminal 194 of the relay coil 183' is permanently connected to ground and to the positive terminal of the battery 177, this connection of its terminal 193 to the negative terminal of the battery 177 energizes the relay coil 183' so as to actuate the relay 183 to open the motor starting circuit through the relay contacts 181 and the contactor 182. This closes a relay holding circuit through contacts 197 and contactor 198, which blocks undesirable repeated energization of the recording head after a recording cycle has been completed and prevents initiation of a new recording cycle until all of the symbol switches have been returned to open positions. Actuation of the relay 183 on energization of its coil 183' also is adapted to complete a circuit from the oscillator 205 to the selected channel or channels of the recording head through the respective connected amplifier or amplifiers corresponding to the digit or instruction to be recorded in accordance with the symbol switch which has been closed on the keyboard 120. This may conveniently be provided by closing a circuit from the oscillator 205 through relay contacts 195 and contactor 182 so as to connect the oscillator output to a common terminal 211 of the amplifiers 206, 207, 208, and 209 for transmittal of an amplified signal to the selected recorder channel or channels in accordance with the symbol switch which is closed.

In this manner, the simplified alternating-current recorder of FIG. 13 incorporates the features of the FIG. 1 recorder together with the simplified features of the direct-current recorder of FIG. 12. If desired, the commutator or switching arrangement operated by the motor 176 may include a single commutator segment of the type shown in FIGS. 1 and 9 or may be of a plural commutator segment type to provide for smaller bits and smaller spaces between discrete longitudinally adjacent bits in each track of the tape record.

While particular embodiments of this invention have been illustrated and described, modifications thereof will occur to those skilled in the art. It is to be understood, therefore, that this invention is not to be limited to the particular details described, and it is intended in the appended claims to cover all modifications within the spirit and scope of this invention.

What is claimed is:

1. A magnetic digital recorder comprising a multichannel recording head, a plurality of symbol switches, means for advancing a magnetizable member a substantially predetermined step across said recording head for each complete recording cycle, means for connecting each symbol switch to one or more selected channels of said recording head in accordance with a predetermined digit as represented by the symbol of the respective switch and for energizing said selected channel or channels for recording the respective symbol on the magnetizable member for a length equivalent to a substantially predetermined fraction of the length of the advance step responsive to the closure of said respective symbol switch and means for energizing preselected channels of said recording head for recording a symbol indicating an error.

2. A magnetic digital recorder comprising a multichannel recording head, a plurality of symbol switches, means for advancing a magnetizable member a substantially predetermined step across said recording head for each complete recording cycle in response to closure of one of said symbol switches, and means for connecting each symbol switch to one or more selected channels of said recording head in accordance with the symbol represented by the respective switch and for energizing said selected channel or channels for recording the respective symbol on the magnetizable member for a substantially predetermined fraction of the step of each recording cycle responsive to the closure of said respective symbol switch.

3. A magnetic digital recorder comprising a multichannel recording head, a plurality of symbol switches, means for advancing a magnetizable member a substantially predetermined step across said recording head for each complete recording cycle in response to closure of one of said symbol switches, and means for connecting each symbol switch to one or more selected channels of said recording head in accordance with the symbol represented by the respective switch and for energizing said selected channel or channels after an initial substantially predetermined fraction of a step for recording the respective symbol on the magnetizable member for a substantially predetermined fraction of the step responsive to the closure of said respective symbol switch.

4. A magnetic digital recorder comprising a multichannel recording head, a plurality of symbol switches, means for advancing a magnetizable member a substantially predetermined step across said recording head for each complete recording cycle in response to closure of one of said symbol switches, and means for connecting each symbol switch to one or more selected channels of said recording head in accordance with the symbol represented by the respective switch and for energizing said selected channel or channels prior to initation of a step advance for recording the respective symbol on the magnetizable member for a length equivalent to a substantially predetermined fraction of the length of the advance step responsive to the closure of said respective symbol switch.

5. A magnetic digital recorder comprising a multichannel recording head, electrically energizable means for movng a magnetizable member past said head, a plurality of symbol switches, means for connecting each symbol switch to one or more selected channels of said recording head in accordance with the symbol represented by the respective switch, means for energizing said magnetizable member moving means to advance the magnetizable member a substantially predetermined extent across said recording head responsive to closure of any of said switches for each recording cycle means for energizing the selected channel or channels of said recording head through closure of the respective symbol switch providing for recording of the respective symbol on the magnetizable member for a length equivalent to a substantially predetermined fraction of the length of the advance step, means for indicating energization of said moving means, and means for energizing preselected channels of said recording head for recording a symbol indicating an error.

6. A magnetic digital recorder comprising a multi-channel recording head, a plurality of symbol switches, means for step advancng magnetic tape across said recording head a substantially predetermined advance for each recording of a symbol responsive to closure of one of said switches, means for connecting each symbol switch to one or more predetermined channels of said recording head in accordance with the symbol represented by the respective switch, means providing for energization of the respective channels of said recording head through said symbol switches for a predetermined fraction of the step of the tape for each complete recording, and means for limiting operation of said tape advancing means and of energization of said recording head to a single operating cycle on closure of any symbol switch until all symbol switches are open.

7. A magnetic digital recorder comprising a multi-channel recording head, a reel assembly for passing magnetic tape past said head, a plurality of symbol switches, means including electrical conductors for connecting each symbol switch to one or more predetermined channels of said recording head in accordance with the symbol to be recorded, means for energizing respective channels of said recording head through closure of said symbol switches for magnetic recordation of the respective symbols on magnetic tape, means for operating the reel assembly to advance magnetic tape across said recording head for a substantially predetermined step for each symbol recording cycle and means for limiting operation of said tape advancing means and of energization of said recording head to a single operating cycle on closure of any symbol switch until all symbol switches are open.

8. An alternating-current magnetic digital recorder comprising a multi-channel recording head, a plurality of symbol switches, means providing for a substantially predetermined step of advance of magnetic tape across said recording head for each operating cycle responsive to closure of one of said switches, means for connecting each symbol switch to one or more predetermined channels of said recording head in accordance with the symbol represented by the respective switch, and means including an oscillator and amplifying means for energizing said recording head through said symbol switches for a substantially predetermined fraction of the step of the tape when the respective switch is maintained closed during a complete recording cycle.

9. A magnetic digital recorder comprising a multi-channel recording head, a plurality of symbol switches, means energizably responsive to closure of one of said symbol switches for moving a magnetizable member a substantially predetermined step across said recording head during an operating cycle, means for connecting each symbol switch to one or more selected channels of said recording head in accordance with the symbol represented by the respective switch and for energizing said selected channel or channels for a substantially predetermined fraction of the step of the magnetizable member for each complete operating cycle with the respective symbol switch closed, and auxiliary means for energizing said magnetizable member moving means after completion of a predetermined part of an operating cycle for thereafter assuring completion of each operating cycle regardless of the position of said symbol switches and including means for limiting energization of said moving means to a single operating cycle until all of said symbol switches are open.

10. A magnetic digital recorder comprising a multi-channel recording head, a reel assembly for passing magnetic tape past said head, a plurality of symbol switches, means for connecting each symbol switch to one or more selected channels of said recording head in accordance with the symbol to be recorded, means including a motor for operating said reel assembly to advance the tape across said recording head, a starting circuit for said motor adapted to be closed by any of said symbol switches, means responsive to a predetermined initial operation of said motor for closing a motor energizing circuit independent of said starting circuit for a cycle of operation whereby to assure a substantially predetermined step of tape across said head and for thereafter opening said motor energizing circuit, and means responsive to a predetermined operation of said motor for opening said starting circuit and holding open said starting circuit until all of said symbol switches are open.

11. A magnetic digital recorder comprising a multi-channel recording head, a reel assembly for passing magnetic tape past said head, a plurality of symbol switches, means for connecting each symbol switch to one or more predetermined channels of said recording head in accordance with the symbol to be recorded and closing a circuit therethrough for energizing respective channels of said recording head by closure of each respective switch, means for operating said reel assembly to advance the tape across said recording head, and latching means for assuring a predetermined cycle of operation on the closure of any of said switches and preventing closure of other switches until all of said switches are open and in position to start a new recordation by closure of one of said switches.

12. An alternating-current magnetic digital recorder comprising a multi-channel recording head, a reel assembly for passing magnetic tape past said head, a plurality of symbol switches, mean for connecting each symbol switch to one or more selected channels of said recording head in accordance with the symbol to be recorded, means including an oscillator and amplifying means for energizing said recording head through closure of one of said symbol switches, means for operating said reel assembly to advance the tape across said recording head responsive to closure of one of said switches, and means operable by said operating means for assuring a substantially predetermined step in the advance of said tape after an initial advance thereof and for limiting operation of said operating means to a predetermined cycle regardless of the position of said symbol switches until all of said switches are open and in position to start a new cycle by closure of one of said switches.

13. A magnetic digital recorder comprising a multi-channel recording head, a plurality of symbol switches, means for connecting said symbol switches to one or more selected channels of said recording head in accordance with the symbol to be recorded for energizing the respective channels, means for advancing tape across said recording head, means operable by said tape advancing means after a predetermined initial operation during each symbol recording cycle for assuring advance of a substantially predetermined step of said tape for each cycle and for limiting operation of said tape advancing means to a predetermined cycle regardless of the position of said symbol switches until all of said switches are open, and means responsive to closure of a switch for latching such switch closed until completion of said recording cycle and for release of said switch to open position on completion of a cycle of operation.

14. A magnetic digital recorder comprising a multi-channel recording head, a plurality of symbol switches, means for advancing a magnetizable member a substantially predetermined extent across said recording head for each complete recording cycle, means for connecting each symbol switch to one or more selected channels of said recording head in accordance with the symbol represented by the respective switch and for energizing said selected channel or channels for recording the respective symbol on the magnetizable member responsive to the closure of said respective symbol switch and for subsequently energizing said magnetizable member advancing means to provide said advance of the magnetizable member, and means for limiting operation of said tape advancing means and of energization of said recording head to a single operating cycle on closure of any symbol switch until all symbol switches are open.

15. In a magnetic digital recorder having a recording head, an operating mechanism comprising a motor for advancing a magnetizable memory member relative to said recording head, a plurality of symbol switches, a starting circuit for said motor, means for energizing said recording head on closure of one of said symbol switches for recording on the memory member and for subsequently deenergizing said recording head and for energizing said motor starting circuit, means responsive to operation of said motor for closing a motor energizing circuit independent of said starting circuit for a cycle of operation and for thereafter opening said energizing circuit, and means responsive to a predetermined operation of said motor for opening said starting circuit and for then holding open said starting circuit as long as one of said symbol switches is closed.

16. In a magnetic digital recorder having a recording head, an operating mechanism comprising a motor for advancing a magnetizable memory member relative to said recording head, a plurality of symbol switches, a starting circuit for said motor, means for energizing said recording head on closure of one of said symbol switches for recording on the memory member and subsequently energizing said motor starting circuit, means responsive to operation of said motor for closing a motor energizing circuit independent of said starting circuit for a cycle of operation and for thereafter opening said energizing circuit, means responsive to a predetermined operation of said motor for opening said starting circuit and for then holding open said starting circuit as long as one of said symbol switches is closed, and means for indicating energization of said motor.

17. A magnetic digital recorder comprising a multichannel recording head, a plurality of symbol switches, electrically energizable means responsive to closure of one of said symbol switches for advancing a magnetizable member across said recording head during an operating cycle, means for connecting each symbol switch to one or more selected channels of said recording head in accordance with the symbol represented by the respective switch and for energizing said selected channel or channels for a substantially predetermined fraction of the advance of the magnetizable member for each complete operating cycle with the respective symbol switch closed, auxiliary circuit means for energizing said magnetizable member advancing means after completion of a predetermined part of an operating cycle for assuring completion thereafter of each operating cycle regardless of the position of said symbol switches and including blocking circuit means for limiting energization of said advancing means to a single operating cycle until all of said symbol switches are open, and means for indicating energization of said magnetizable member advancing means.

18. A magnetic digital recorder comprising a multichannel recording head, a plurality of symbol switches, means for connecting each symbol switch to one or more selected channels of said recording head in accordance with the symbol represented by the respective switch and for energizing said selected channel or channels for thereby making a magnetic recordation on a magnetizable member, electrically energizable means responsive to closure of one of said symbol switches for advancing the magnetizable member across said recording head during an operating cycle after each recordation, means for providing an auxiliary energizing circuit for said magnetizable member advancing means after completion of a predetermined fraction of an operating cycle for assuring completion thereafter of each operating cycle regardless of the position of said symbol switches and including blocking circuit means for limiting energization of said advancing means to a single operating cycle until all of said symbol switches are open, and means for indicating energization of said magnetizable member advancing means.

19. A magnetic digital recorder comprising a multichannel recording head, a reel assembly for passing magnetic tape past said head, a plurality of symbol switches, means for connecting each symbol switch to one or more selected channels of said recording head in accordance with the symbol to be recorded, means including a motor for operating said reel assembly to advance the tape across said recording head, a starting circuit for said motor adapted to be closed by any of said symbol switches, means responsive to a predetermined initial operation of said motor for closing a motor energizing circuit independent of said starting circuit for a cycle of operation whereby the advance of a substantially predetermined step of tape across said head is assured and for thereafter opening said motor energizing circuit, means responsive to a predetermined operation of said motor for opening said starting circuit and holding open said starting circuit until all of said symbol switches are open, means for energizing respective channels of said recording head including an oscillator and an amplifier, means including said starting circuit for initially energizing said oscillator and said amplifier substantially simultaneously with said initial energization of said motor responsive to closure of any one of said symbol switches, and means responsive to substantially predetermined initial operation of said motor for connecting the output of said oscillator to said amplifier whereby said selected channel or channels of said recording head are energized through the respective closed symbol switch, said motor independent energizing circuit closing means simultaneously deenergizing said oscillator and said amplifier on opening of said motor independent energizing circuit.

20. A magnetic digital recorder comprising a multichannel recording head, a plurality of symbol switches, means for connecting each symbol switch to one or more selected channels of said recording head in accordance with the symbol to be recorded, means for advancing a magnetic member across said recording head, a starting circuit for said advancing means adapted to be closed by any of said symbol switches, means responsive to a predetermined initial operation of said advancing means for closing an energizing circuit for said advancing means independent of said starting circuit for a cycle of operation whereby a substantially predetermined advance of said magnetic member across said head is assured and for thereafter opening said energizing circuit, means responsive to a predetermined operation of said advancing means for opening said starting circuit and holding open said starting circuit until all of said symbol switches are open, means for energizing respective channels of said recording head including an oscillator and an amplifier, means including said starting circuit for initially energizing said oscillator and said amplifier substantially simultaneously with said initial energization of said advancing means responsive to closure of any one of said symbol switches, and means for connecting the output of said oscillator to said amplifier a substantially predetermined fraction of an operating cycle after said initial energization thereof whereby said selected channel or channels of said recording head are energized through the respective closed symbol switch, said advancing means independent energizing circuit closing means simultaneously deenergizing said oscillator and said amplifier on opening of said advancing means independent energizing circuit and said means for holding open said advancing means starting circuit until all symbol switches are open assuring non-energization of said oscillator and said amplifier therethrough after deenergization thereof whereby said recording head is deenergized prior to stoppage of movement of the magnetic member past said head.

21. A magnetic digital recorder comprising a multichannel recording head, a reel assembly for passing magnetic tape past said head, a plurality of symbol switches, means for connecting each symbol switch to one or more selected channels of said recording head in accordance with the symbol to be recorded, means including a motor for operating said reel assembly to advance the tape across said recording head, a starting circuit for said motor adapted to be closed by any of said symbol switches, means responsive to a predetermined initial operation of said motor for closing a motor energizing circuit independent of said starting circuit for a cycle of operation whereby the advance of a substantially predetermined step of tape across said head is assured and for thereafter opening said motor energizing circuit, means responsive to a predetermined operation of said motor for opening said starting circuit and holding open said starting circuit until all of said symbol switches are open, means for energizing respective channels of said recording head including an oscillator and an amplifier means, means including said starting circuit for initially energizing said oscillator and said amplifier means substantially simultaneously with said initial energization of said motor responsive to closure of any one of said symbol switches, and means for connecting the output of said oscillator to said amplifier means a substantially predetermined fraction of the operating cycle after said initial energization thereof whereby said selected channel or channels of said recording head are energized through the respective closed symbol switch, said motor independent energizing circuit closing means simultaneously deenergizing said oscillator and said amplifier means on opening of said motor independent energizing circuit and said means for holding open said motor starting circuit until all symbol switches are open assuring nonenergization of said oscillator and said amplifier means through said starting circuit after deenergization whereby said recording head is deenergized on each stoppage of magnetic tape past said head on deenergization of said motor after each operating cycle.

22. In a magnetic digital recorder an operating mechanism comprising a motor, a plurality of symbol switches, a starting circuit for said motor adapted to be closed by any of said switches, means responsive to operation of said motor for closing a motor energizing circuit after an initial predetermined operation and independent of said starting circuit for a cycle of operation and for thereafter opening said energizing circuit, and means responsive to a predetermined operation of said motor for opening said starting circuit and holding open said starting circuit until all of said symbol switches are open.

23. In a magnetic digital recorder, an operating mechanism comprising a motor, a plurality of symbol switches, a starting circuit for said motor adapted to be closed by any of said switches, means responsive to operation of said motor for closing a motor energizing circuit independent of said starting circuit for a cycle of operation and for thereafter opening said energizing circuit, and means responsive to a predetermined operation of said motor for opening said starting circuit and for then holding open said starting circuit as long as one of said symbol switches remains closed.

References Cited

UNITED STATES PATENTS

| | | | |
|---|---|---|---|
| 1,795,870 | 3/1931 | Legg | 346—33 |
| 2,517,316 | 8/1950 | Holmes | 346—33 |
| 2,539,832 | 1/1951 | Hathaway | 346—33 |
| 2,668,261 | 2/1954 | Hooker et al. | 335—139 X |
| 2,856,256 | 10/1958 | Carman et al. | 346—74 |
| 3,103,401 | 9/1963 | Daniels et al. | 346—17 |

BERNARD KONICK, *Primary Examiner.*

IRVING L. SRAGOW, *Examiner.*

R. M. JENNINGS, J. BREIMAYER,
*Assistant Examiners.*